United States Patent [19]

Toner

[11] 4,127,855
[45] Nov. 28, 1978

[54] TRAILER HITCH MONITOR

[76] Inventor: Thomas J. Toner, 8225 Hiawatha Cir., Eden Prairie, Minn. 55344

[21] Appl. No.: 730,433

[22] Filed: Oct. 7, 1976

[51] Int. Cl.² ............................................. G08B 21/00
[52] U.S. Cl. ..................................... 340/687; 280/432; 340/52 R
[58] Field of Search ............... 340/275, 52 R, 282, 340/256; 280/432, 422; 180/82 R; 200/61.18, 61.41

[56] References Cited

U.S. PATENT DOCUMENTS

| | | | |
|---|---|---|---|
| 2,564,520 | 8/1951 | Blasdell | 340/275 |
| 3,710,370 | 1/1973 | Quilici et al. | 340/275 |
| 3,792,432 | 2/1974 | Ellis et al. | 340/52 R |
| 4,008,466 | 2/1977 | Smith | 340/282 |

Primary Examiner—John W. Caldwell, Sr.
Assistant Examiner—Donnie L. Crosland
Attorney, Agent, or Firm—Merchant, Gould, Smith, Edell, Welter & Schmidt

[57] ABSTRACT

An electrical circuit for monitoring the connection between a trailer and a trailer hitch. An electrical conductor is connected to the tongue of the trailer and the trailer hitch is grounded. A visual indicator is in series between the electrical conductor and a power source to provide an indication of trailer coupling as long as electrical continuity is maintained by the connection of the trailer to the hitch. An audible warning device and switch are in parallel with the visual indicator to provide a warning when electrical continuity is broken.

5 Claims, 1 Drawing Figure

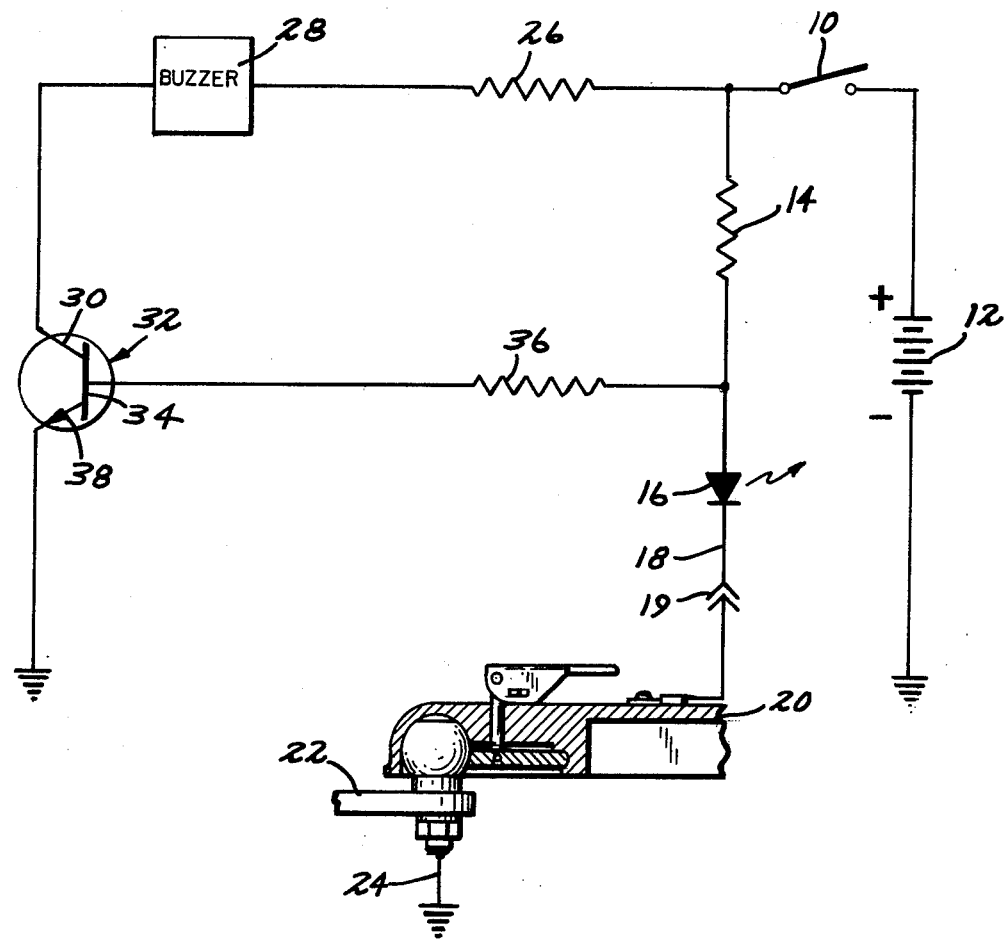

TRAILER HITCH MONITOR

BACKGROUND OF THE INVENTION

The present invention relates broadly to devices for monitoring the connection between a trailer and a trailer hitch. More particularly, the present invention is a device which monitors whether or not a trailer is coupled to a conventional ball-type hitch and provides an indication of proper coupling and a warning of faulty coupling.

Devices are known in the prior art which provide an alarm signal when a trailer becomes uncoupled from a trailer hitch. The prior art devices include those which have a mechanical switch that is actuated by the trailer when the trailer releases from the hitch. Such devices typically have a switch actuating arm disposed above the ball of a conventional ball-type hitch. If the trailer becomes uncoupled from the ball, the tongue of the trailer which is secured to the hitch flies upward actuating the switch and causing an alarm signal in the vehicle operator compartment. Although such devices are adequate, they are not particularly adaptable to conventional ball-type hitches. The structure of the prior devices is such that owners of standard ball-type hitches would not be able to use the warning device and would, in fact, have to replace their conventional hitches with one which includes the alarm switch.

The present invention solves the disadvantage of the prior devices in that it provides a trailer hitch monitoring circuit that may be added to any conventional ball-type hitch to provide a warning signal when the coupling between the trailer and the hitch becomes faulty. The addition of the monitoring circuit of the present invention to ball-type trailer hitches currently in use would significantly decrease the potential of accidents occurring when trailers become uncoupled from trailer hitches while in motion and the resulting property damage therefrom.

SUMMARY OF THE INVENTION

The present invention is an electrical circuit for monitoring the coupling between a trailer and a trailer hitch. It includes a conductor connected to the trailer and to which a D.C. voltage is applied. The ball of the trailer hitch is grounded and a path of electrical continuity is completed when the trailer is in contact with the ball. An indicator is in series between the D.C. voltage source and the trailer to provide the vehicle operator with an indication of proper hitch coupling. A warning means is provided in parallel with the indicator so that when the path of electrical continuity between the trailer and ball hitch is broken the warning means provides an alarm indication of faulty coupling.

In one embodiment of the present invention, the indicator is a light emitting diode having its cathode connected to the electrical conductor leading to the trailer and its anode connected through a resistor and an energization switch to the voltage supply. The warning means includes a normally off transistor with its base connected through a resistor to the anode of the light emitting diode. The emitter of the transistor is grounded while the collector connected to one terminal of a buzzer and a second terminal connected through a resistor to the voltage source through the energization switch. With electrical continuity established between the trailer and ball-type hitch, the light emitting diode is illuminated while the transistor is off. When the coupling becomes faulty breaking the electrical circuit through the hitch, voltage begins to rise at the base of the transistor, turning the transistor on causing a current to flow in the buzzer giving an audible warning indication of the faulty condition of the coupling.

The vehicle operator, thus, is provided with a continuous visual indication as long as the coupling between the trailer and the trailer hitch is secure. When the coupling becomes faulty, however, an immediate audible signal is generated to warn the operator. It will be noted that the present invention may be utilized with any conventional trailer and trailer hitch, requiring simply the connection of an electrical conductor to the trailer tongue and the grounding of the ball-type switch. These and other advantages of my invention will become apparent with reference to the following drawings, detailed description of the preferred embodiment, and claims.

BRIEF DESCRIPTION OF THE DRAWING

The sole FIGURE is a schematic of the electrical circuit of the present invention and includes an illustration of the connection of the circuit to the tongue of a trailer and the grounding of the trailer hitch.

DESCRIPTION OF THE PREFERRED EMBODIMENT

Referring to the drawing, the present invention includes a switch 10 for connecting the monitoring circuit to a voltage supply 12 which in the preferred embodiment is the vehicle battery. One branch of the monitoring circuit includes a resistor 14 in series with a light emitting diode 16 having its cathode connected through an electrical conductor 18 and connector 19 to the tongue 20 of a trailer. The trailer hitch 22, illustrated in the preferred embodiment as a conventional ball-type hitch, is grounded by conductor 24.

A second leg of the monitoring circuit includes a resistor 26 in series with an audible warning device 28 having one terminal connected to the collector 30 of a transistor 32. Base 34 of transistor 32 is connected through a resistor 36 to the anode of light emitting diode 16. The transistor emitter is grounded.

In operation, with tongue 20 in contact with hitch 22 and switch 10 closed, current flows through resistor 14, light emitting diode 16, conductor 18, connector 19, and through the hitch coupling to ground. The light emitting diode 16, therefore, provides a visual indication that the hitch coupling is satisfactory. The electrical resistance of the coupling between the trailer and hitch is typically on the order of 20 ohms and, therefore, resistor 14 and resistor 36 are selected so that the voltage appearing at base 34 of transistor 32 will not be sufficient to drive the transistor into conduction. If the coupling becomes faulty, electrical continuity between trailer 20 and hitch 22 is interrupted preventing a current flow through light emitting diode 16. Simultaneously, the voltage appearing on base 34 increases turning transistor 32 on permitting current flow through resistor 26, audible warning device 28, and transistor 32 to ground. Audible warning device 28 may be any conventional buzzer actuated by current flow. When receiving the audible warning signal, the vehicle operator may then stop to check the trailer coupling. The operator is thus provided with a warning as the coupling first becomes faulty before the complete separation of the trailer from the hitch.

It should be noted that the connection of the trailer safety chains to the vehicle frame must be electrically insulated so that electrical continuity between tongue 20 and ground will not continue to be established even though the contact between tongue 20 and hitch 22 is interrupted. The insulation may be achieved by simply providing a plastic covering over the hooks which are typically utilized in connecting the trailer safety chain to the vehicle.

The present invention, thus, is a trailer hitch coupling monitoring circuit easily adaptable for use with conventional trailer hitches. The monitoring circuit provides a continuous visual indication of safe coupling condition and an immediate audible warning when the coupling becomes faulty.

What is claimed is:

1. An electrical circuit attachment apparatus for monitoring a connection between a trailer and a conventional ball-type trailer hitch, said ball hitch having a single piece metal ball secured to a frame mounted on a motor vehicle, said trailer having a metal tongue member which is releasably connected to said ball, said electrical apparatus connected to a DC power source, comprising:
   (a) electrical conductor means for connecting said metal tongue member to said DC power source;
   (b) electrical conductor means for grounding said single piece metal ball so that a path of electrical continuity is established between said tongue member and said ground through said metal ball when said tongue member is in contact with said ball; and
   (c) indicator means connected in series between said power source and said tongue member for providing an indication of contact between said metal ball and said tongue member.

2. An electrical circuit attachment apparatus in accordance with claim 1 wherein said indicator means comprises:
   (a) visual indicator means connected in series between said power source and said tongue member for providing a visual indication of contact between said metal ball and said tongue member; and
   (b) warning circuit means in parallel with said visual indicator means for providing a signal when said metal ball and said tongue member are not in contact with each other.

3. An electrical circuit attachment apparatus in accordance with claim 2 wherein said warning means comprises:
   (a) an audible alarm; and
   (b) switch means in series with said audible alarm, said switch means having an open and a closed state, said switch means being switched from open to closed state when said metal ball and said tongue member are disconnected.

4. An electrical circuit attachment apparatus in accordance with claim 3 wherein said visual indicator means comprises a light emitting diode having its anode connected to said power source and its cathode connected to said DC power source.

5. An electrical circuit attachment apparatus in accordance with claim 4 wherein said switch means is comprised of a transistor having a base connected to said anode of said light emitting diode, a collector connected to said audible alarm and a grounded emitter.

* * * * *